United States Patent [19]

Haldric et al.

[11] Patent Number: 4,854,141

[45] Date of Patent: Aug. 8, 1989

[54] ANTI-ROTATION LOCKING DEVICE INCLUDING A TORQUE LIMITATION FOR A MOTOR VEHICLE STEERING COLUMN

[75] Inventors: Bernard Haldric; Gregorio Benedi, both of Vendome; Sylvie Baudon née Chardon, Naveil, all of France

[73] Assignee: NACAM, Vendome, France

[21] Appl. No.: 129,955

[22] Filed: Dec. 4, 1987

Related U.S. Application Data

[63] Continuation of Ser. No. 868,360, May 29, 1986, abandoned.

[30] Foreign Application Priority Data

May 31, 1985 [FR] France .................. 85 08262

[51] Int. Cl.$^4$ .......................... B60R 25/02; F16C 3/00
[52] U.S. Cl. .......................... 70/182; 70/252; 70/422
[58] Field of Search .................. 70/182–189, 70/252, 422; 280/775, 779, 780; 464/37, 38

[56] References Cited

U.S. PATENT DOCUMENTS

| | | | |
|---|---|---|---|
| 1,146,345 | 7/1915 | Opperman | 70/182 |
| 3,023,995 | 3/1962 | Hopkins | 192/88.8 |
| 3,187,527 | 6/1965 | Moss et al. | 70/252 |
| 3,230,739 | 1/1966 | Stewart | 64/28 |
| 3,250,101 | 5/1966 | Jeavons et al. | 70/252 |
| 3,566,633 | 3/1971 | Borck | 70/252 |
| 3,570,286 | 3/1971 | Rohrbough | 70/185 X |
| 3,795,122 | 3/1974 | Lipschutz | 70/182 |
| 3,835,725 | 9/1974 | Furusho et al. | 70/252 X |
| 4,041,730 | 8/1977 | Kress | 64/30 D |
| 4,559,795 | 12/1985 | Zagoroff | 70/252 X |
| 4,570,468 | 2/1986 | Bemm et al. | 70/185 X |
| 4,738,154 | 4/1988 | Hancock | 70/252 X |
| 4,750,380 | 6/1988 | Hoblingre et al. | 70/185 X |

FOREIGN PATENT DOCUMENTS

| | | | |
|---|---|---|---|
| 0035415 | 9/1981 | European Pat. Off. | 70/182 |
| 2904386 | 8/1980 | Fed. Rep. of Germany | 70/252 |
| 3435084 | 4/1986 | Fed. Rep. of Germany | 70/252 |
| 1427941 | 1/1966 | France | 70/184 |
| 2057347 | 4/1971 | France | |
| 0191149 | 11/1982 | Japan | 70/182 |
| 0073349 | 4/1984 | Japan | 70/252 |

Primary Examiner—Robert L. Wolfe
Assistant Examiner—Suzanne L. Dino
Attorney, Agent, or Firm—Emmanuel J. Lobato; Robert E. Burns

[57] ABSTRACT

The device comprises, mounted on the steering column, a sleeve (2) in the outer surface of which are provided cavities (3) for receiving the bolt (4) of a locking system (5) for preventing rotation of the column. The sleeve is mounted on the column with a tight fit which produces the deformation of at least one of the two parts beyond the elastic limit of the material from which it is made.

3 Claims, 5 Drawing Sheets

ANTI-ROTATION LOCKING DEVICE INCLUDING A TORQUE LIMITATION FOR A MOTOR VEHICLE STEERING COLUMN

This is a continuation of application Ser. No. 868,360, filed May 29, 1986, now abandoned.

The present invention relates to steering columns for motor vehicles and more particularly to locking devices including a torque limitation for steering columns.

Locking devices without a torque limitation are known which comprise an anti-rotation locking device for the column by the immobilization of the latter by means of a bolt cooperating with a keeper connected to the column. The devices of this type have the defect of being destroyed if the torque applied to the steering wheel carried by the column is sufficient to result in the twisting or breakage of the bolt of the locking device, or the disengagement of the bolt from the keeper.

With the device without a limitation of torque, it is consequently possible to release the steering shaft and consequently the steering wheel of the vehicle.

Further, the destruction of the locking device results in deformations of the component parts of the latter which are liable to result in an accidental locking of the steering column.

In order to overcome these drawbacks, locking devices having a torque limitation have been proposed which allow the rotation of the shaft without destruction of the component parts beyond a certain rotational torque applied to the steering wheel, this torque being however sufficiently high to prohibit the steering of the vehicle.

Among the locking devices of this second type, there are known friction devices comprising a sleeve provided with a slot for the introduction of a locking bolt. This sleeve is mounted on the shaft of the steering column by means of a third member, such as a spring, elastically yieldable washers, etc . . . , which determine the value of the frictional force to be overcome in order to rotate the shaft relative to the sleeve.

Locking devices are also known which involve the uncoupling of toothed sectors.

Such a device comprises a socket connected to the shaft of the steering column and including at one of its ends radial teeth which cooperate with corresponding radial teeth provided on a sleeve which surrounds the shaft and is prevented from rotating. A spring ensures the engagement of the teeth of the socket and sleeve. When the torque applied to the shaft reaches a predetermined value, the forces exerted on the teeth have an axial component which causes the axial displacement of the sleeve and the uncoupling of the column from the latter during the application of this torque.

An object of the invention is to improve the locking devices having a torque limitation by providing such a device whose construction requires a smaller number of component parts than the number of component parts in the construction of known devices.

The invention provides an anti-rotation locking device having a torque limitation for a motor vehicle steering column, comprising, mounted on the steering column, a sleeve in the outer surface of which are provided cavities for receiving the bolt of a locking means for said column, wherein the sleeve is mounted on the column with a gripping causing the deformation of at least one of the two pats to the extent of exceeding the elastic limit of the material from which it is made.

A better understanding of the invention will be had from the following description with reference to the accompanying drawings, which are given solely by way of examples and in which.

Figure 1:
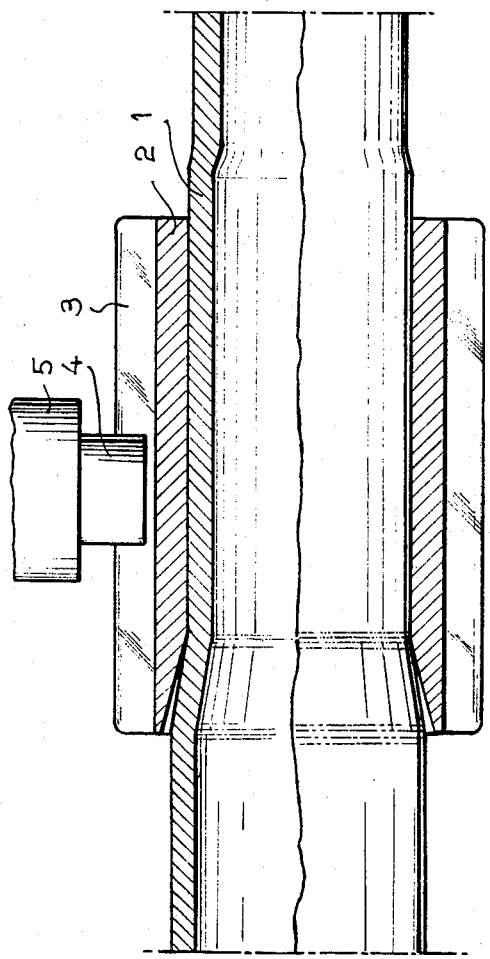
FIG. 1 is a diagrammatic sectional view of a locking device having a torque limitation according to the invention.

The locking device having a torque limitation shown in FIG. 1 comprises, mounted on a tubular portion 1 of a steering column shaft, a sleeve 2 of massive metal, for example steel, provided in its outer surface with grooves 3 adapted to receive the bolt 4 of locking means 5 for preventing rotation of the column.

The sleeve 2 is a tight fit on the shaft 1 so as to create friction therebetween. The frictional torque is then proportional to the tight fit or gripping effect which is a function of the tolerances of the parts. But, when the desired frictional torque must be within a range of very close values, the manufacturing tolerances of the two parts must be very narrow, which is not compatible with a cheap mass production.

In order to ensure that the frictional torque obtained is not a function of the tolerances of the parts according to the invention, the dimensions of the inner bore of the sleeve 2 and of the outer section of the shaft portion 1 which receives the sleeve, are such that the tight fit causes the deformation of the shaft portion 1 by the massive sleeve 2 to a value beyond its elastic limit, the residual tight fit then remaining constant and depending solely on the residual elasticity of the material of the shaft and on the length of the sleeve in contact with said shaft.

In order to ensure a minimum deviation from the frictional torque, the length of the sleeve 2 may be adapted in accordance with the characteristics of the material of the shaft 1.

It will be understood that there may also be chosen the complementary solution which consists in producing the plastic deformation of the sleeve 2 while the dimension of the shaft portion on which this sleeve is mounted remains constant.

Figure 4:
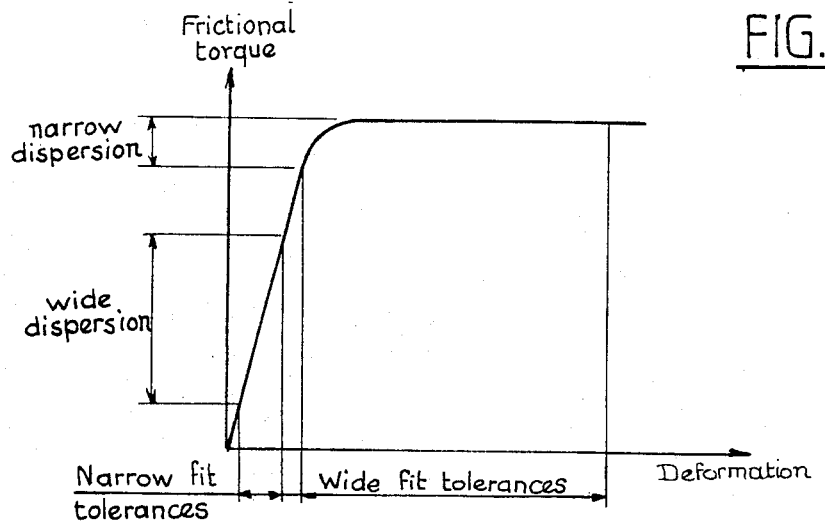
FIG. 4 is a graph showing the frictional torque curve as a function of the deformation.

FIG. 4 shows a curve representing the value of the frictional torque as a function of the deformation obtained in the manner described hereinbefore. In the arrangement shown in FIG. 1, the residual elasticity of the shaft 1 ensures a friction by an elastic tight fit or gripping between the shaft 1 and the sleeve 2.

When the shaft 1 of the steering column is solid, the sleeve mounted on this shaft is made to deform.

In order to ensure an assembly with a tight fit, with a fit beyond the elastic limit of one of the parts, the outside diameter of the shaft 1, before assembly, must exceed the inside diameter of the bore 6 of the sleeve 2 by a value exceeding the normal close tolerances.

Figure 2:
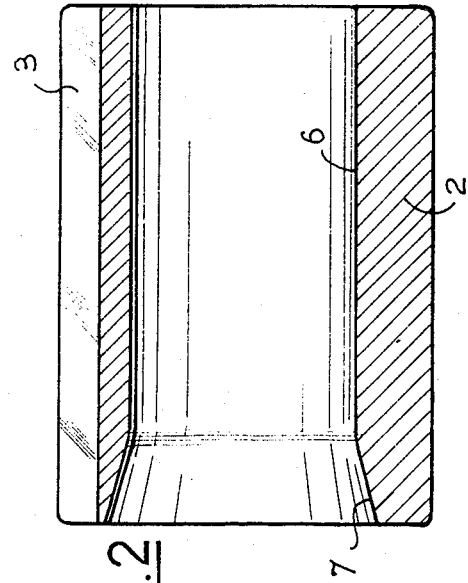
FIG. 2 is an elevational and sectional view of the sleeve which is part of the construction of the locking device according to the invention.
Figure 3:
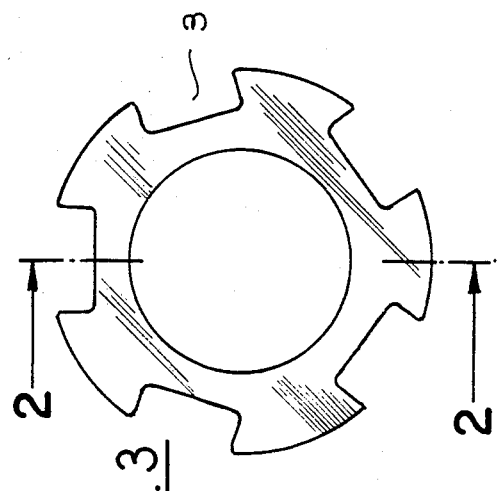
FIG. 3 is an end elevational view of the sleeve of FIG. 2.

In order to facilitate the introduction of the sleeve 2 and above all to maintain a maximum residual elasticity, this sleeve has an inner tapered bore 7 of small value as shown in FIG. 2, for example less than 15°, or a combination of cones and/or radii so that the connection with the bore satisfies this condition.

In order to ensure that the entrance cone 7 of the sleeve 2 does not interfere with the operation of the system and does not participate in the frictional torque, the sleeve is placed in position in the following manner. First of all, the sleeve 2 is mounted on the shaft 1 of the column to a given position and then it is slightly withdrawn, for example a distance of 5 mm. This withdrawal ensures that there is no longer any contact between the entrance cone 7 of the sleeve and the shaft 1 of the column.

Figure 5:
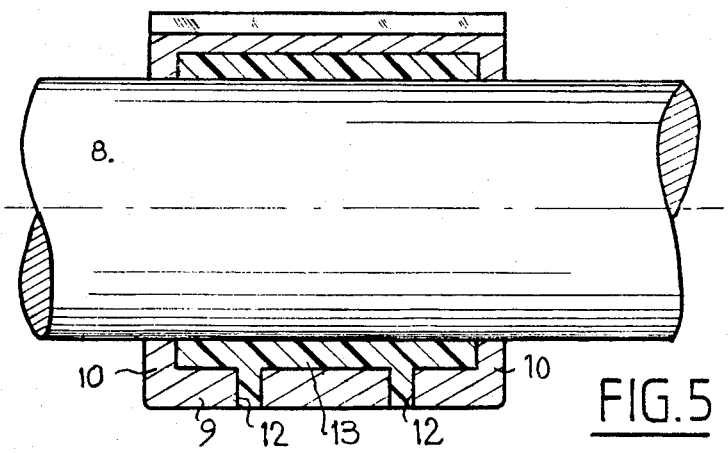
FIG. 5 is a sectional view of a sleeve provided with an inert of friction material mounted on a solid shaft portion of constant section.

There is shown in FIG. 5 a sectional view of a locking device according to the invention comprising a solid shaft portion of constant section of a steering column, on which shaft portion is mounted a sleeve 9 provided with two inwardly extending end flanges 10 which define with the outer surface of the shaft 8 an annular chamber 11. Formed in the lateral surface of the sleeve 9 are apertures 12 through which is injected a plastic material forming a friction lining 13. The elasticity of the sleeve 9 performs the function of a spring and the plastic material serves to provide a constant coefficient of friction.

Figure 6:
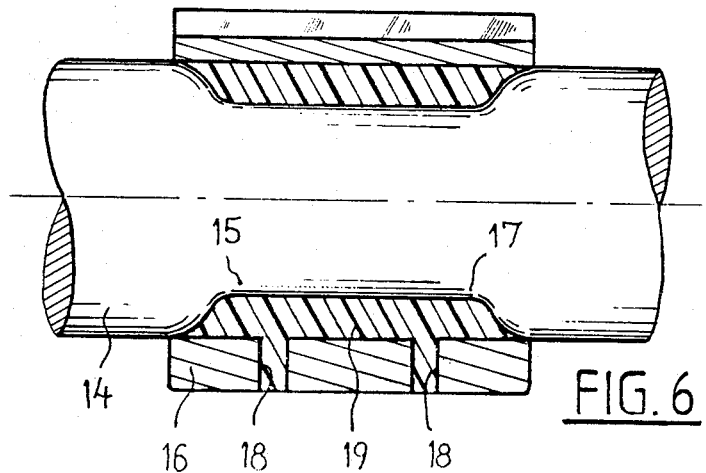
FIG. 6 is a sectional view of a sleeve provided with an inner lining of friction material mounted on a portion of reduced section of a solid shaft of a steering column.

FIG. 6 shows a locking device similar to that of FIG. 5 in which the solid shaft portion 14 of the steering column includes a portion 15 of reduced section on which is disposed a sleeve 16 which is devoid of end flanges, the sleeve 16 and the outer surface of the portion 15 of reduced diameter of the shaft 14 defining a chamber 17 in which is injected a plastic friction material through apertures 18 provided in the lateral surface of the sleeve 16. The injected plastic material in this way provides a friction lining 19. Here again, the elasticity of the sleeve 16 acts as a spring and plastic material of the lining serves to provide a constant coefficient of friction.

Figure 7:
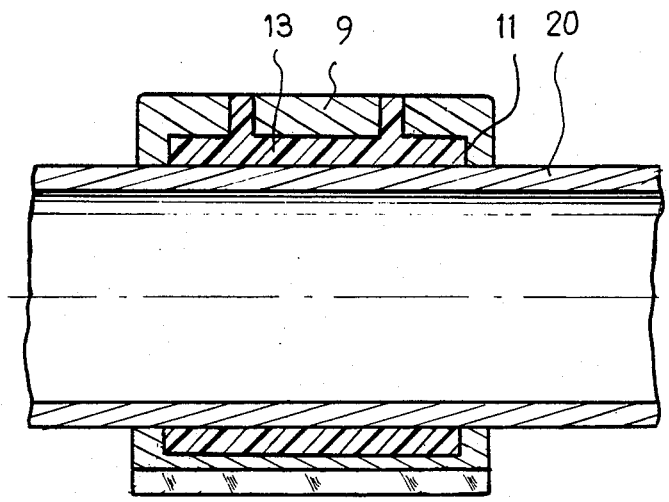
FIGS. 7 and 8 are sectional views of respective variants of the arrangements of FIGS. 5 and 6 applied to tubuluar shafts.

The device shown in FIG. 7 is similar to that of FIG. 5, except that the sleeve 9 is mounted on a tubular shaft portion 20. The elasticity is then achieved by the deformation of the tube brought about by the injection into the annular chamber 11 of plastic material constituting the lining 13.

Figure 8:
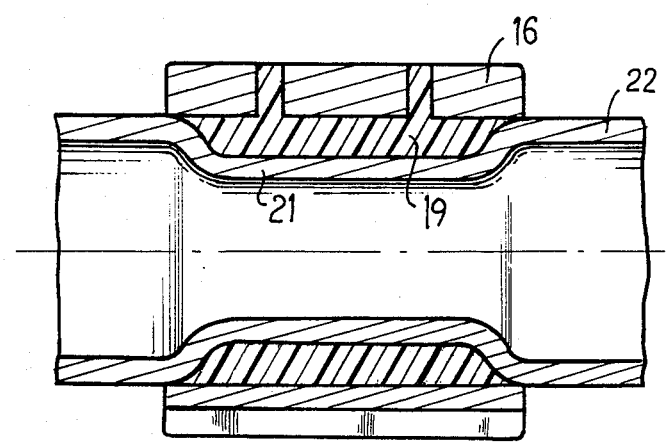

The device shown in FIG. 8 is similar to that of FIG. 6, except that the sleeve 16 is mounted on a portion 21 of reduced section of a tubular shaft 22. Here again, the elasticity is achieved by the deformation of the tubular portion brought about by the injection of the friction lining 16.

Figure 9:
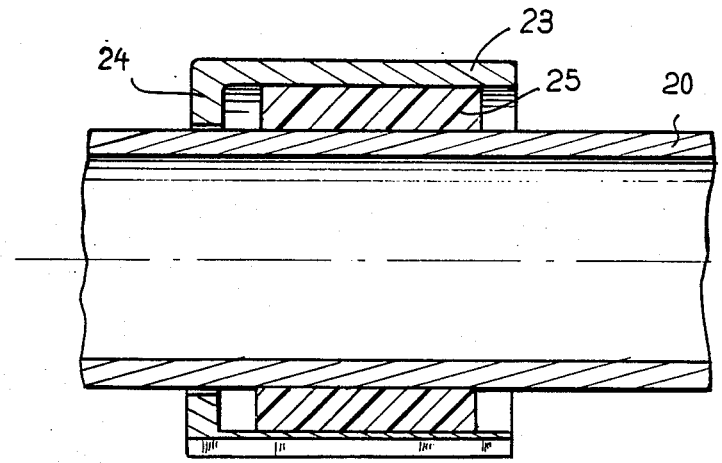
FIGS. 9 and 10 are sectional view of respective variants of FIGS. 7 and 8 having added inserts.

The device shown in FIG. 9 is a modification of that shown in FIG. 7 in which a tubular shaft 20 of constant section carries a metal sleeve 23 which is open at one end and provided with an inwardly extending flange 24 at its opposite end. Placed between the sleeve 23 and the shaft 20 is an insert of plastic material 25 whose function is similar to that of the linings 13 of the embodiments of FIGS. 5 and 7.

Figure 10:
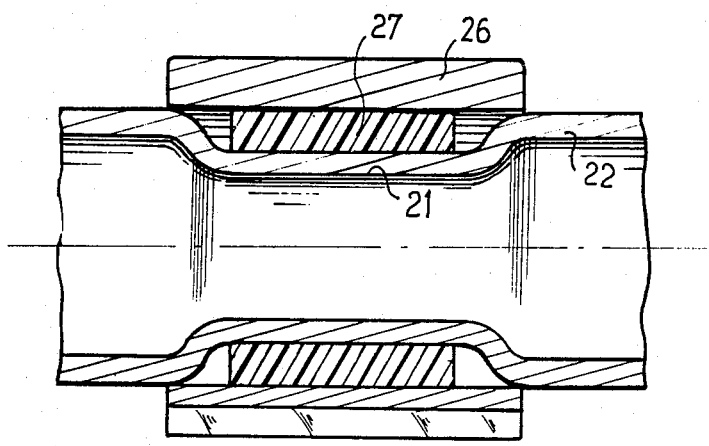

The device shown in FIG. 10 is a modification of the device of FIG. 8 in which the portion 21 of reduced section of a tubular shaft 22 carries a sleeve 26, an added insert 27 of plastic material being disposed in the cavity defined by the outer surface of the reduced portion 21 of the shaft and the sleeve 26.

The insert 27 may be advantageously formed by a split tubular member so as to facilitate its positioning on the reduced portion 21 of the shaft.

Figure 11:
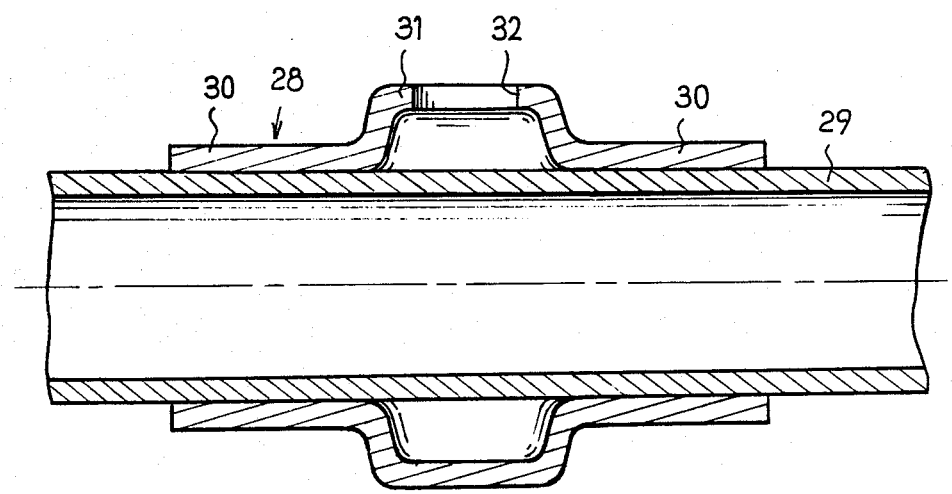
FIG. 11 is a sectional view of a device according to the invention provided with a sleeve having two friction portions.

The device shown in FIG. 11 is formed by a sleeve 28 mounted directly on a shaft 29 of constant section. The sleeve 28 has two bearing zones 30 by which the sleeve is engaged on the shaft 29 with a tight fit causing the deformation of the shaft 29 beyond its elastic limit, and a central portion 21 of larger diameter in which are provided slots 32 evenly spaced apart on the periphery of the sleeve and adapted to receive the bolt of the locking means for preventing rotation of the column (not shown).

Thus it can be seen that, in all the embodiments described hereinbefore, there is obtained by deformation of the shaft portion of the steering column or by deformation of the sleeve mounted with a tight fit on a shaft portion, a frictional torque between these two parts which, as shown in FIG. 4, is determined by said deformation in such manner as to be substantially constant. There is consequently obtained by means of the invention a locking device for a steering column which, while employing a number of component parts reduced to a minimum, ensures the locking of the column and allows the rotation of the latter beyond a torque exerted on the steering wheel which may be determined with precision.

What is claimed is:

1. A torque-limitation type anti-rotation locking device for a vehicle having a steering column metallic shaft, said locking device comprising, in combination, two elements consisting of said steering column metallic shaft as a first element and a metallic sleeve as a second element disposed circumferentially of a selected length, of said steering column metallic shaft in direct contact therewith along substantially cylindrical surfaces, the metallic sleeve having circumferentially disposed recesses for receiving a locking bolt selectively insertable into one of said recesses for locking and preventing rotation of the steering column shaft, said metallic sleeve being mounted on the steering column metallic shaft with a radially directed tight fit effected solely by the metallic sleeve and the steering column metallic shaft for effectively preventing rotation of the steering column metallic shaft when locked and for developing solely as a function of said radially directed tight fit a plastic deformation beyond the elastic limit alternatively of the material of the metallic sleeve or the material of the steering column metallic shaft upon rotation of the metallic shaft when locked, and the metallic sleeve having a length selected as a function of the characteristic of the residual elasticity of whichever of said first element and said second element is selected to undergo said plastic deformation.

2. A torque-limitation type anti-rotation locking device for a vehicle having a steering column metallic shaft, said locking device comprising, in combination, two elements consisting of said steering column metallic shaft as a first element and a metallic sleeve as a second element disposed circumferentially of a selected length, of said steering column metallic shaft in direct contact therewith, the metallic sleeve having circumferentially disposed recesses for receiving a locking bolt selectively insertable into one of said recesses for locking and preventing rotation of the steering column shaft, said metallic sleeve being mounted on the steering column metallic shaft with a tight fit effected solely by the metallic sleeve and the steering column metallic shaft without other means for effectively preventing rotation of the steering column metallic shaft when locked and for developing as a function of said tight fit a plastic deformation beyond the elastic limit alternatively of the material of the metallic sleeve or the material of the steering column metallic shaft upon rotation of the metallic shaft when locked, and the metallic sleeve having a length selected as a function of the characteristic of the residual elasticity of whichever of said first element and said second element is selected to undergo said plastic deformation, and said first element being selected to undergo said plastic deformation.

3. A torque-limitation type anti-rotation locking device for a vehicle having a steering column metallic shaft, said locking device comprising, in combination, two elements consisting of said steering column metallic shaft as a first element and a metallic sleeve as a second element disposed circumferentially of a selected length, of said steering column metallic shaft in direct contact therewith, along substantially cylindrical surfaces, the metallic sleeve having circumferentially disposed recesses for receiving a locking bolt selectively insertable into one of said recesses for locking and preventing rotation of the steering column shaft, said metallic sleeve being mounted on the steering column metallic shaft with a radially directed tight fit effected solely by the metallic sleeve and the steering column metallic shaft for effectively preventing rotation of the steering column metallic shaft when locked and for developing solely as a function of said tight fit a plastic deformation beyond the elastic limit alternatively of the material of the metallic sleeve or the material of the steering column metallic shaft upon rotation of the metallic shaft when locked, and the metallic sleeve having a length selected as a function of the characteristic of the residual elasticity of whichever of said first element and said second element is selected to undergo said plastic deformation, and said second element being selected to undergo said plastic deformation.

* * * * *